United States Patent [19]
Hunag

[11] Patent Number: 5,803,582
[45] Date of Patent: Sep. 8, 1998

[54] LASER POINTER

[75] Inventor: Chaochi Hunag, Taipei Hsien, Taiwan

[73] Assignee: Quarton, Inc., Taipei Hsien, Taiwan

[21] Appl. No.: 613,912

[22] Filed: Mar. 11, 1996

[51] Int. Cl.⁶ .......................... F21V 33/00; F21L 15/06; F21L 7/00; F21K 27/00
[52] U.S. Cl. .................... 362/109; 362/259; 362/157; 362/190; 362/196; 362/200
[58] Field of Search .................... 362/259, 109, 362/118, 157, 190, 196, 200

[56] References Cited

U.S. PATENT DOCUMENTS

| | | | |
|---|---|---|---|
| 2,261,000 | 10/1941 | Muldoon | 362/157 |
| 3,323,118 | 5/1967 | Chen | 362/190 |
| 4,754,378 | 6/1988 | Chen | 362/196 |
| 5,119,280 | 6/1992 | Yang | 362/109 |
| 5,143,442 | 9/1992 | Ishikawa et al. | 362/196 |
| 5,268,829 | 12/1993 | Lo | 362/259 |
| 5,343,376 | 8/1994 | Huang | 362/259 |
| 5,544,967 | 8/1996 | Yao | 362/118 |
| 5,570,967 | 11/1996 | Chen | 362/118 |
| 5,663,828 | 9/1997 | Knowles et al. | 362/118 |

Primary Examiner—Ira S. Lazarus
Assistant Examiner—Matthew Spark
Attorney, Agent, or Firm—Morton J. Rosenberg; David I. Klein; Jun Y. Lee

[57] ABSTRACT

A laser pointer which includes a barrel having two opposite inside pins at one end for mounting and a hanging hole at an opposite end for hanging, a socket sliding in the barrel at one end to hold a battery set, the socket having two longitudinal sliding slots at two opposite side respectively coupled to the inside pins of the barrel, and a laser module holder shaped like a stepped tube fixedly connected to one end of the socket to hold a semiconductor laser module on the inside and a press button on the outside near the socket. The press button is exposed to the outside for operation when the inside pins of the barrel are moved to one end of each longitudinal sliding slot of the socket; the press button is received inside the barrel and concealed from sight when the inside pins of the barrel are moved to the opposite end of each longitudinal sliding slot of the socket.

7 Claims, 9 Drawing Sheets

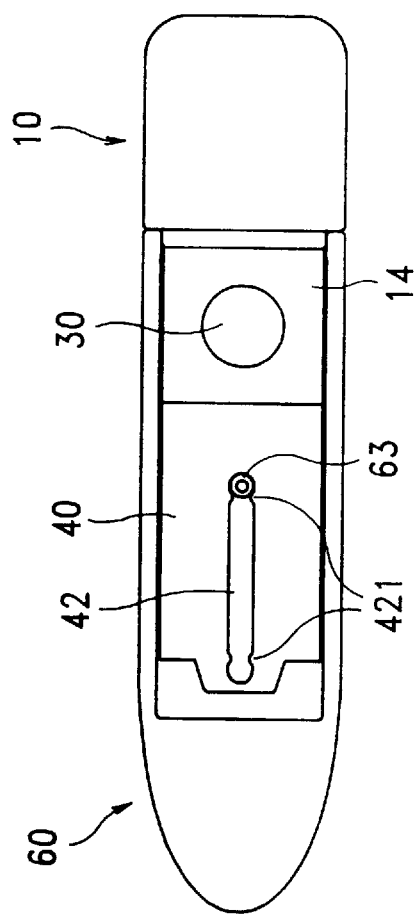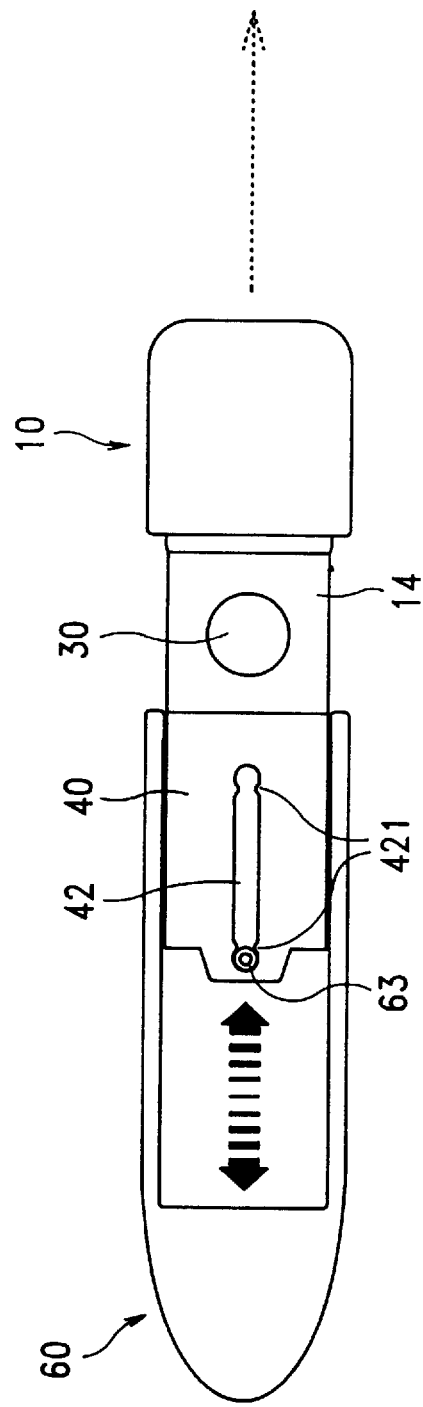

LASER POINTER

BACKGROUND OF THE INVENTION

The present invention relates to laser pointers, and relates more particularly to a compact laser pointer for comfortable holding and convenient for carrying.

Various laser pointers have been disclosed for use to point things out on a map, blackboard, etc., and have appeared on the market. These laser pointers are commonly made of elongated shape having a power switch disposed on the outside for controlling the operation of the laser module. Because the casings of conventional laser pointers have a fixed length, the length of conventional laser pointers cannot be shortened when not in use. Furthermore, because the power switch is disposed on the outside, it tends to be triggered by an error to waste battery power supply.

SUMMARY OF THE INVENTION

The present invention has been accomplished to provide a laser pointer which eliminates the aforesaid drawbacks. It is one object of the present invention to provide a laser pointer which can be adjusted to conceal the press button from sight when it is not in use. It is another object of the present invention to provide a laser pointer which can be adjusted to shorten the length when it is not in use. It is still another object of the present invention to provide a laser pointer which is orthopedically engineered for comfortably holding. It is still another object of the present invention to provide a laser pointer which has a hanging hole for hanging a key chain or the like. According to one embodiment of the present invention, the laser pointer comprises a barrel having two opposite inside pins at one end for mounting and a hanging hole at an opposite end for hanging, a socket sliding in the barrel at one end to hold a battery set, the socket having two longitudinal sliding slots at two opposite side respectively coupled to the inside pins of the barrel, and a laser module holder shaped like a stepped tube fixedly connected to one end of the socket to hold a semiconductor laser module on the inside and a press button on the outside near the socket, wherein the press button is exposed to the outside for operation when the inside pins of the barrel are moved to one end of each longitudinal sliding slot of the socket; the press button is received inside the barrel and concealed from sight when the inside pins of the barrel are moved to the opposite end of each longitudinal sliding slot of the socket.

BRIEF DESCRIPTION OF THE DRAWINGS

FIG. 7A is a plain view showing the inside pins of the barrel fastened to the elongated sliding slots of the laser module holder at one end according to the first embodiment of the present invention;

FIG. 7B is similar to FIG. 7A but showing the inside pins of the barrel fastened to the elongated sliding slots of the laser module holder at the opposite end;

DETAILED DESCRIPTION OF THE PREFERRED EMBODIMENT

Figure 1:
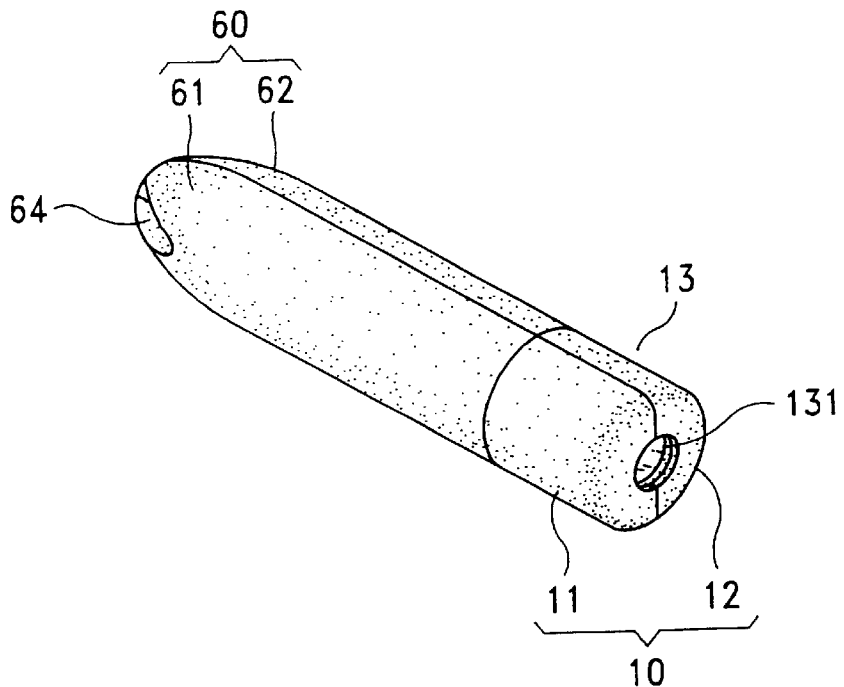
FIG. 1 is an elevational view of a laser pointer according to a first embodiment of the present invention, showing the neck portion of the laser module holder and the press button concealed from sight.
Figure 2:
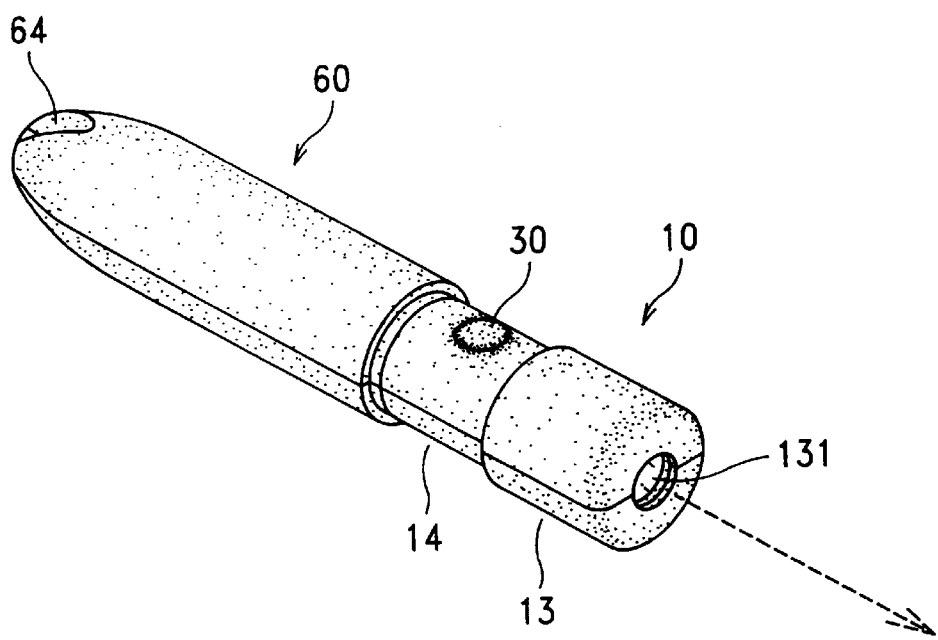
FIG. 2 is similar to FIG. 1 but showing the neck portion of the laser module holder pulled out of the barrel, and the press button exposed to the outside.
Figure 3:
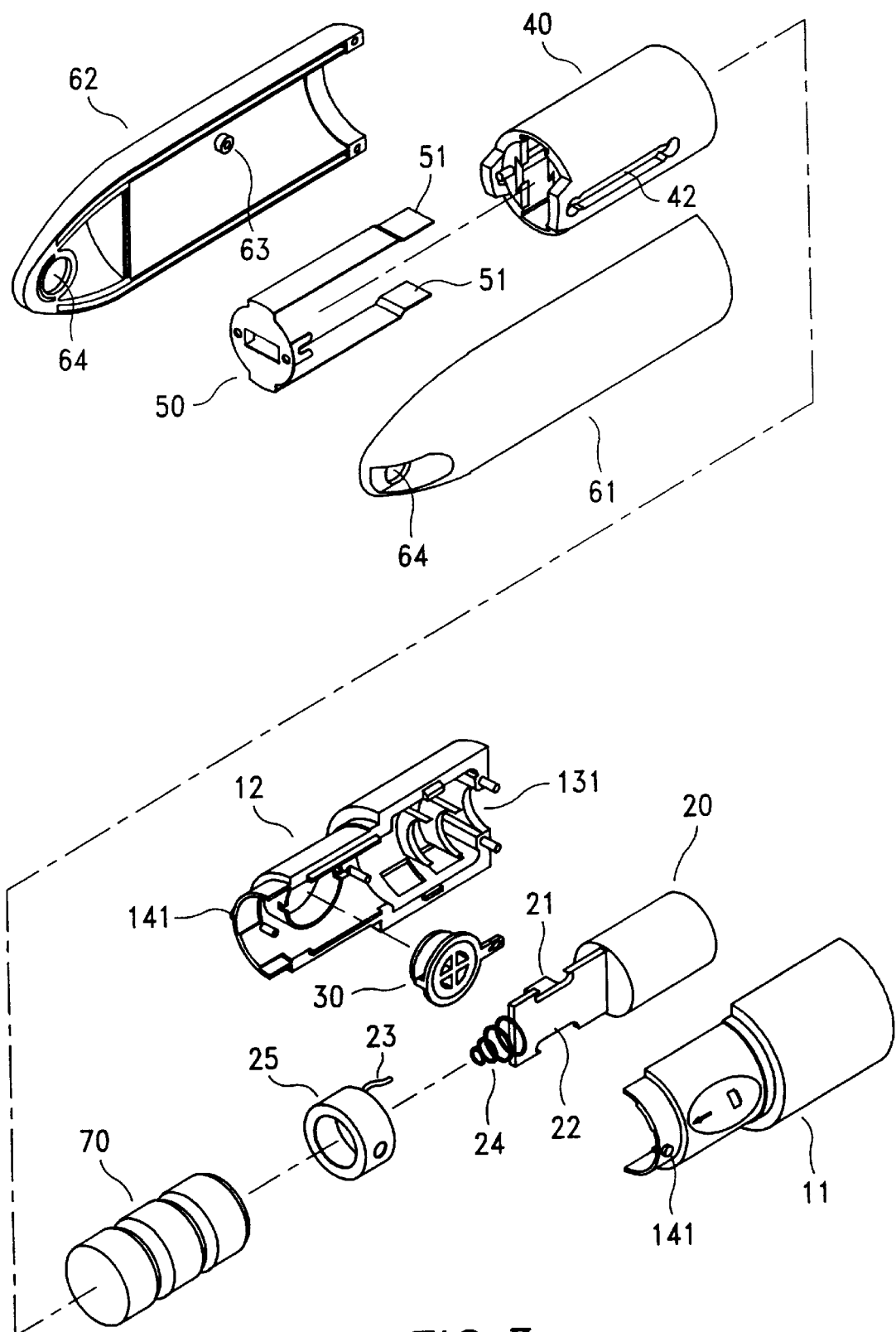
FIG. 3 is an exploded view of the laser pointer shown in FIG. 1.

Referring to FIGS. 1, 2, and 3, a laser pointer in accordance with the present invention is generally comprised of a laser module holder 10 shaped like a stepped tube, a semiconductor laser module 20 mounted inside the laser module holder 10, a press button 30 mounted on the laser module holder 10 at one side and stopped at the ON/OFF switch 21 of the semiconductor laser module 20, a socket 40, a battery set 70 mounted in the socket 40, a metal contact plate 50 mounted in the socket 40, and a barrel 60 mounted around the socket 40. The laser module holder 10 is made by fastening two symmetrical half shells 11 and 12 together, having a hand-hold portion 13 of relatively bigger outer diameter at one end and a neck portion 14 of relatively smaller outer diameter at an opposite end. The aforesaid press button 30 is fastened to the stepped neck portion 14. The hand-hold portion 13 defines a longitudinal center hole, namely, the laser firing hole 131 for passing the laser beam from the semiconductor laser module 20. The laser module holder 10 further comprises two opposite side pins 141 respectively raised from the periphery of the stepped neck portion 14 at two opposite sides. The socket 40 comprises two opposite retaining grooves 41 on the inside at two opposite locations corresponding to the opposite side pins 141 of the laser module holder 10 (see also FIG. 5), and two opposite elongated sliding slots 42 longitudinally disposed at two opposite sides. The barrel 60 is made by fastening two symmetrical shells 61 and 62 together, having two inside pins 63 raised from the inside wall at two opposite locations corresponding to the elongated sliding slots 42 of the socket 40, and a hanging hole 64 at the closed, tapered rear end thereof remote from the laser module holder 10 for mounting a key chain or the like.

Figure 4:
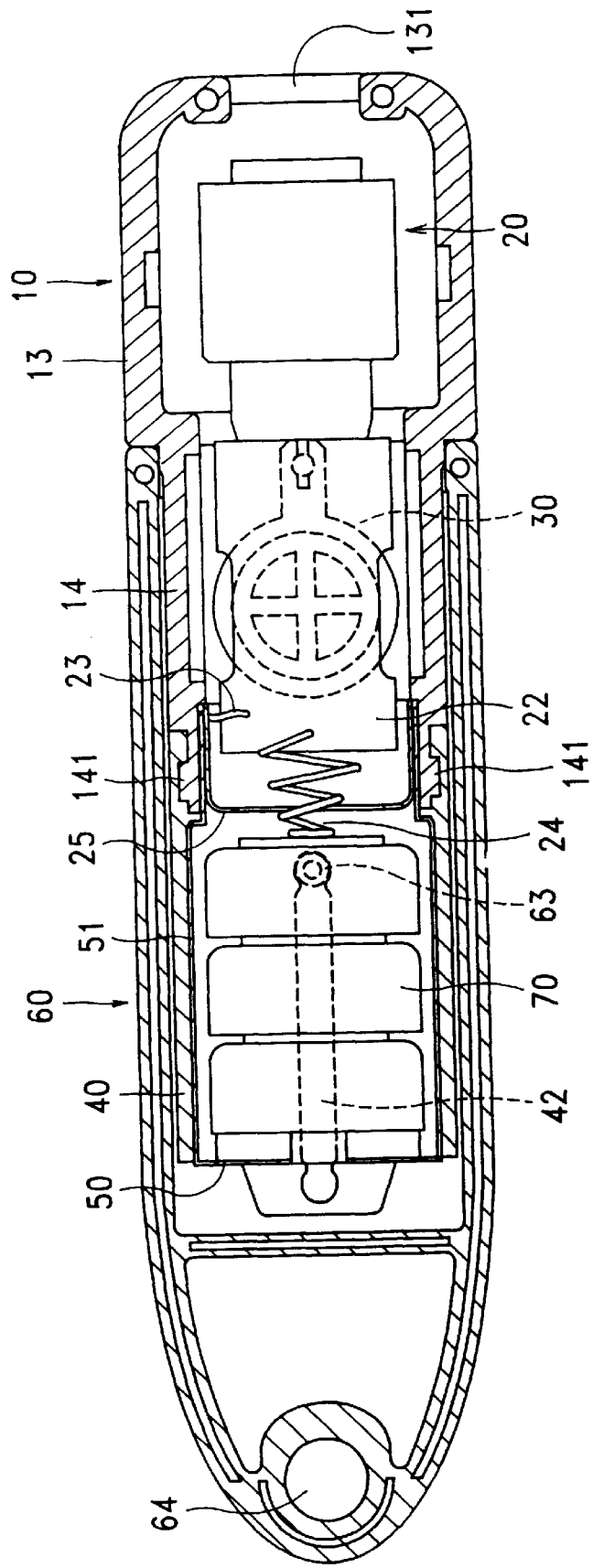
FIG. 4 is a longitudinal view in section of the laser pointer shown in FIG. 1.

Referring to FIG. 4, and FIGS. 1, 2, and 3 again, the socket 40 is mounted inside the barrel 60 by inserting the inside pins 63 into the elongated sliding slots 42 respectively; the battery set 70 is mounted in the socket 40 and disposed in contact with the metal contact plate 50; the metal contact plate 50 is mounted inside the socket 40 and disposed in contact with one end of the battery set 70 on the inside, having two contact legs 51 extending out of the socket 40 and disposed in contact with a metal contact ring 25, which is mounted inside laser module holder 10 and connected to one terminal of the circuit board 22 of the laser module 20 by a conductor 23, which circuit board 22 has an opposite terminal coupled with a metal spiral contact 24, which is disposed in contact with the opposite end of the battery set 70; the laser module holder 10 is connected to the socket 40 by fastening the side pins 141 to the retaining grooves 41 respectively; the switch 21 of the semiconductor laser module 20 has two opposite terminals respectively connected to the two opposite terminals of the circuit board 22. Therefore, the circuit board 22, the metal spiral contact 24, the metal contact ring 25, the battery set 70, and the metal contact plate 50 form a circuit. When the press button 30 is depressed, the circuit is closed, and the semiconductor laser module 20 is driven to emit a laser beam. When the press button 30 is released, the circuit is opened, and the semiconductor laser module 20 does no work.

Figure 5:
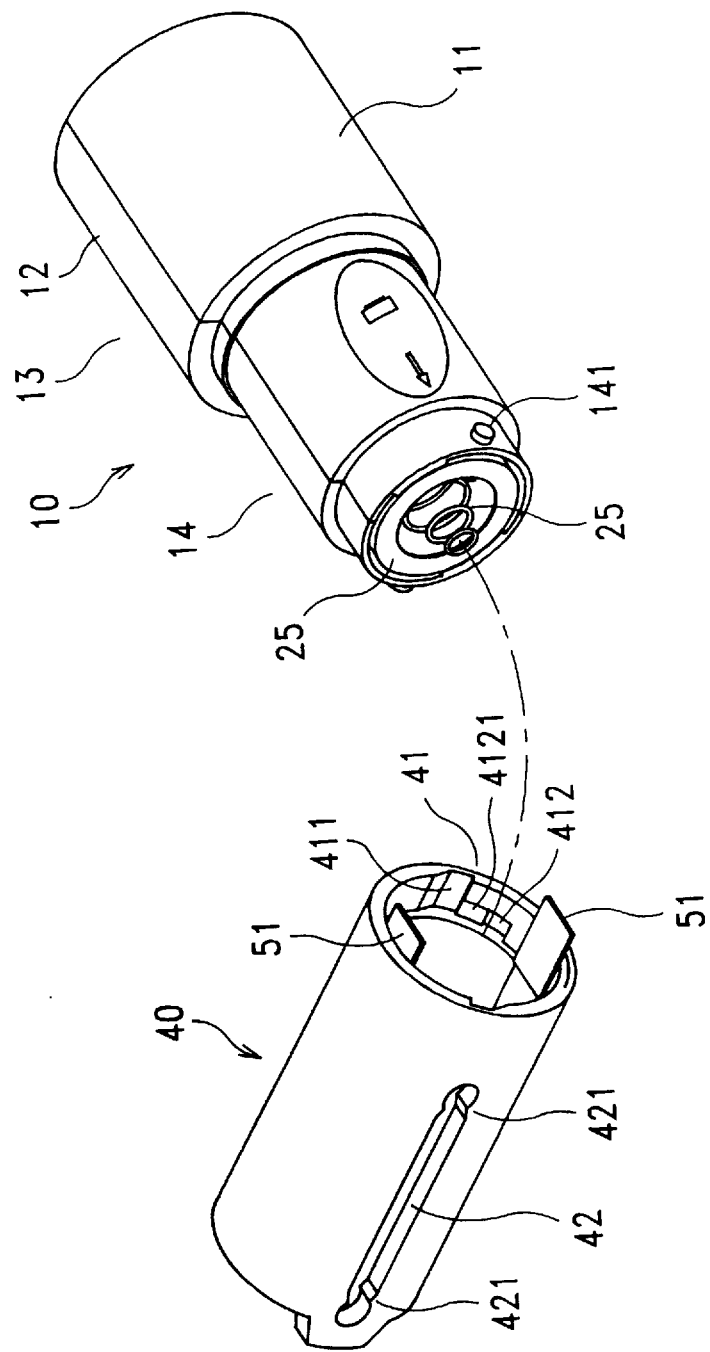
FIG. 5 is an elevational view of the socket and the laser module holder according to the first embodiment of the present invention.

Referring to FIG. 5, each of the retaining grooves 41 comprises a longitudinal section 411, a radial section 412 extending from the inner end of the longitudinal section 411 at right angles, and a raised portion 4121 in the radial section 412 adjacent to the longitudinal section 411.

Figure 6A:
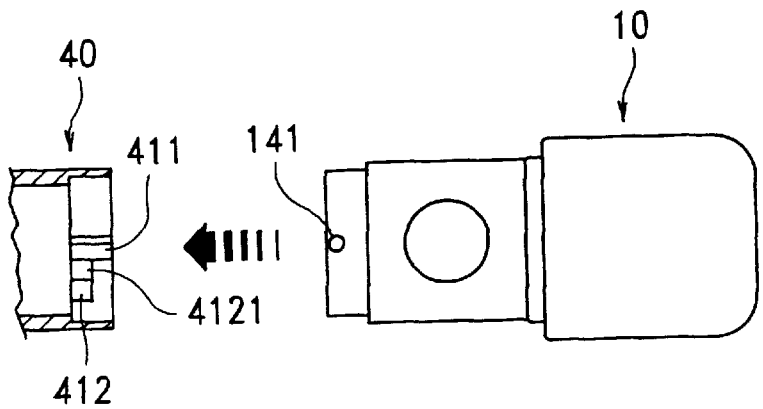
FIG. 6A shows the connection between the socket and the laser module holder according to the first embodiment of the present invention (before the insertion of the side pins of the laser module holder into the retaining grooves of the socket)
Figure 6B:
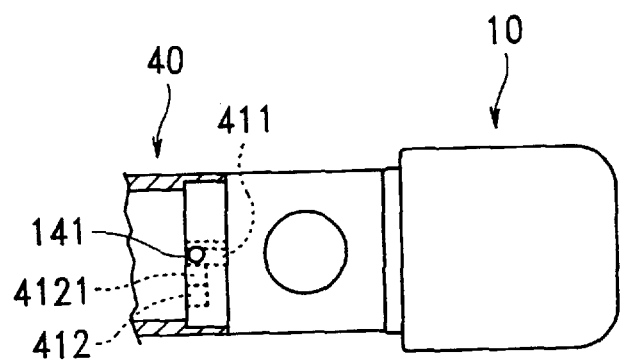
FIG. 6B shows the side pins of the laser module holder respectively inserted into the longitudinal sections of the retaining grooves of the socket according to the first embodiment of the present invention.
Figure 6C:
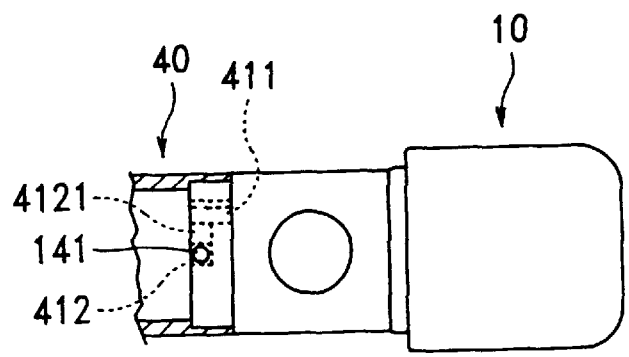
FIG. 6C shows the side pins of the laser module holder moved over the respective raised portions into engagement of the radial sections of the retaining grooves of the socket according to the first embodiment of the present invention.

Referring to FIGS. 6A, 6B, and 6C, when the side pins 141 of the laser module holder 10 are respectively inserted into the longitudinal sections 411 of the two retaining grooves 41 of the socket 40, the laser module holder 10 is turned in one direction relative to the socket 40 to force the side pins 41 over the raised portions 4121 into engagement with the radial sections 412 respectively, and therefore the laser module holder 10 is connected to the socket 40.

Referring to FIGS. 7A and 7B, each of the elongated sliding slots 42 has two neck portions 421 near two opposite ends. By pulling the barrel 60 from the socket 40 to move the inside pins 63 over the neck portions 421 at one end into engagement with one end of each elongated sliding slot 42, the neck portion 14 of the laser module holder 10 is disposed outside the barrel 60, and the press button 30 is exposed to the outside for operation; by pushing the barrel 60 toward the socket 40 to move the inside pins 63 over the neck portions 421 at an opposite end into engagement with the opposite end of each elongated sliding slot 42, the neck portion 14 of the laser module holder 10 is received inside the barrel 60, and therefore the press button 30 is concealed from sight.

Figure 8:
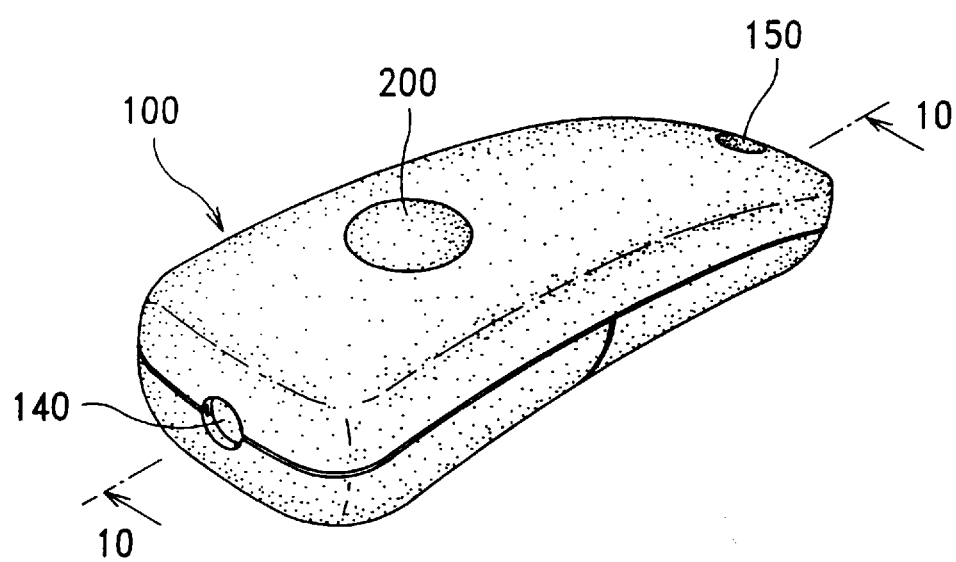
FIG. 8 is an elevational view of a laser pointer according to a second embodiment of the present invention.

FIG. 8 shows a laser pointer according to a second embodiment of the present invention. The laser pointer of the second embodiment of the present invention is comprised of a flat, elongated casing 100 smoothly curved in the longitudinal direction, having a firing hole 140 at one end, a hanging hole 150 at an opposite end, and a press button 200 at the top side.

Figure 9:
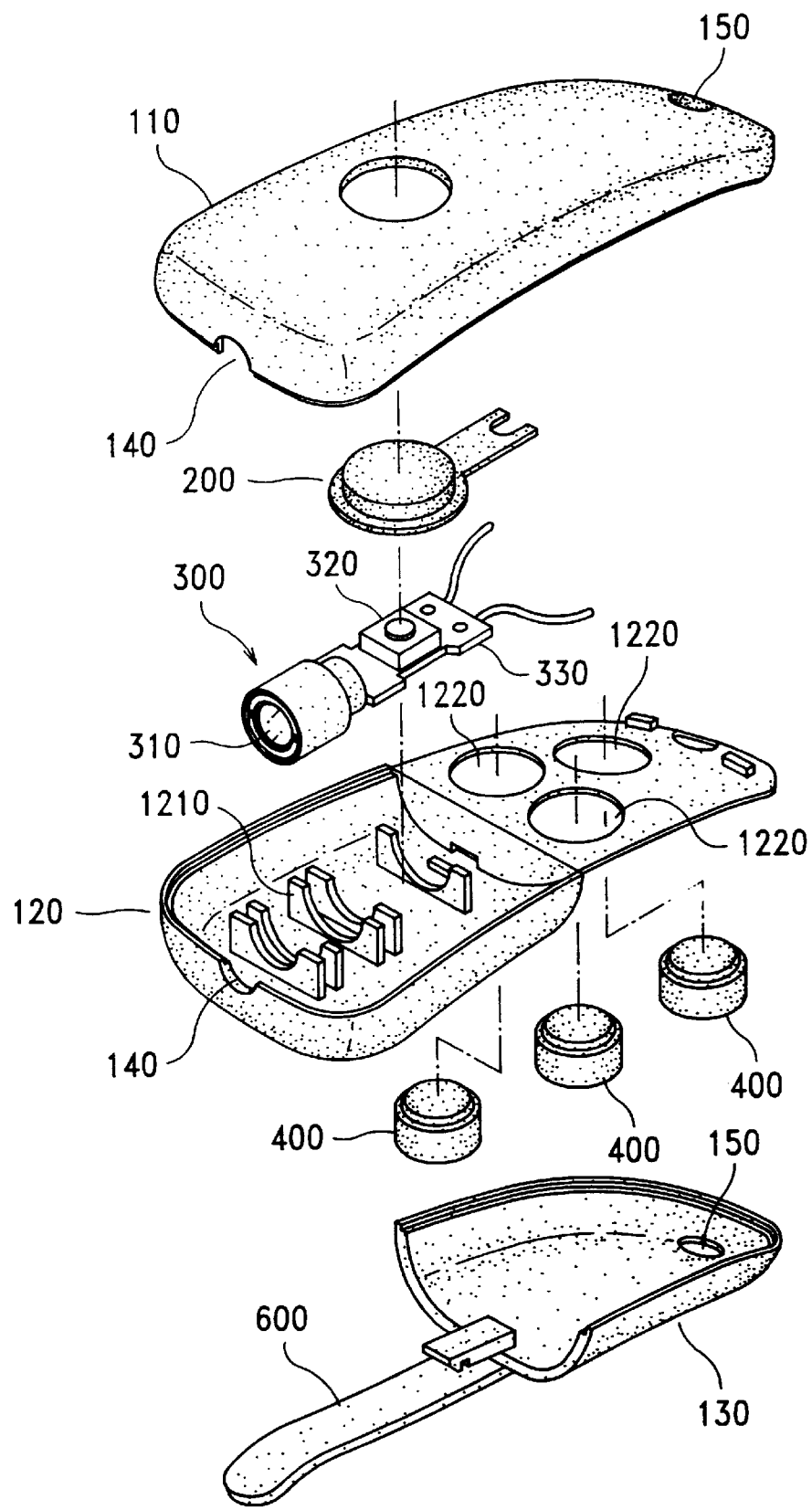
FIG. 9 is an exploded view of the laser pointer shown in FIG. 8.
Figure 10:
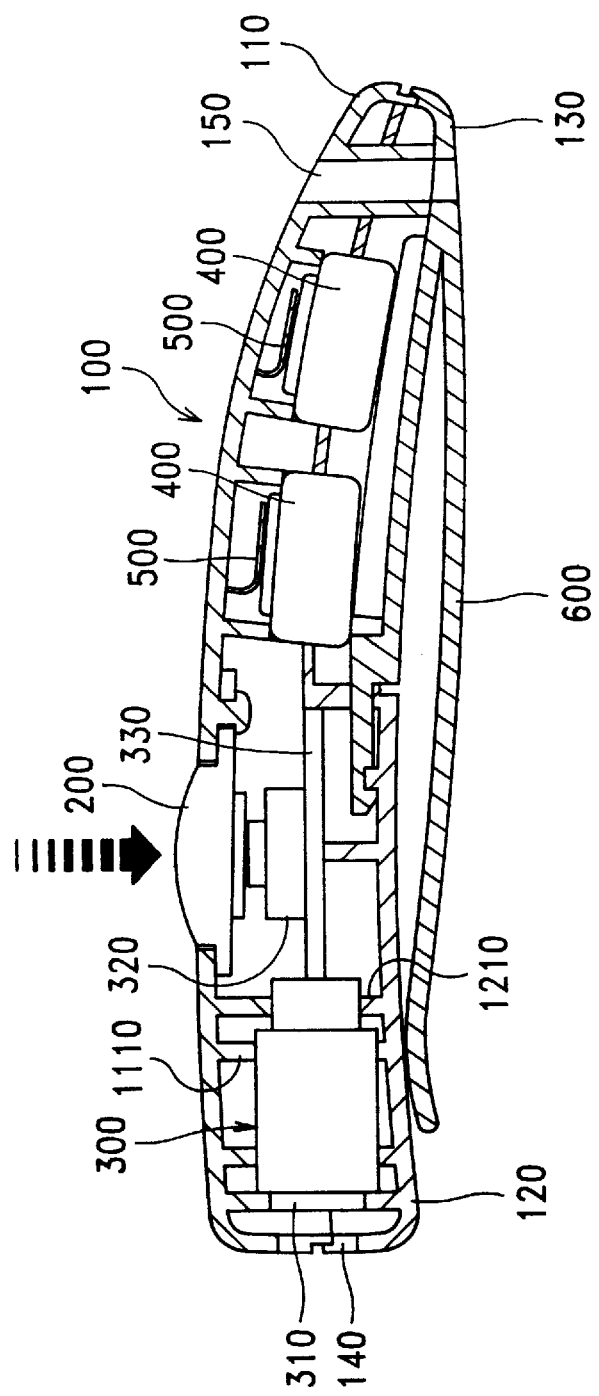
FIG. 10 is a sectional view taken along line 10—10 of FIG. 8.

FIG. 9 is an exploded view of the laser pointer shown in FIG. 8. FIG. 10 is a sectional view taken along line 10—10 of FIG. 8. As illustrated, the casing 100 is comprised of a top shell 110, a bottom shell 120, and a battery cover 130. The battery cover 130 is fastened to the bottom shell 120 by for example hooks or screws. A semiconductor laser module 300 is mounted in the space defined between the top shell 110 and the bottom shell 120, and retained in place by clamping supports 1110 and 1210 in the top shell 110 and the bottom shell 120. The laser beam emitting end 310 of the semiconductor laser module 300 is disposed in alignment with the firing hole 140 of the casing 100. The ON/OFF switch 320 of the semiconductor laser module 300 is disposed beneath the press button 200. The bottom shell 120 has a plurality of battery slots 1220, which holds a respective battery cell 400. A plurality of metal contact plates 500 are respectively mounted inside the top shell 110 and connected between the circuit board 330 of the semiconductor laser module 300 and the battery cells 400. The battery cover 130 has a clip 600 for fastening. Furthermore, a hanging hole 150 is made through the casing 100 at one end remote from the firing hole 140 for hanging.

Referring to FIGS. 8 and 10 again, the top side of the casing 100 is smoothly curved outwards in the longitudinal direction for the holding of the hand comfortably. The press button 200 has a dome-like top partially projecting over the convex top side of the top shell 110. When the press button 200 is depressed, the ON/OFF switch 320 is switched on, causing the semiconductor laser module 300 to emit a laser beam through the laser beam emitting end 310 out of the firing hole 140.

It is to be understood that the drawings are designed for purposes of illustration only, and are not intended as a definition of the limits and scope of the invention disclosed.

I claim:

1. A laser pointer comprising a casing, a battery set mounted inside said casing, and a semiconductor laser module mounted inside said casing and connected to said battery set and controlled to emit a laser beam, wherein said casing comprises:

a barrel having two inside pins raised from an inside wall thereof at two opposite locations;

a socket sliding in said barrel at one end to hold said battery, said socket comprising two retaining grooves on an inside thereof at two opposite locations, and two opposite elongated sliding slots longitudinally disposed at two opposite sides and respectively coupled to said inside pins of said barrel; and a laser module holder shaped like a steeped tube fastened to one end of said socket to hold said semiconductor laser module on an inside thereof of said laser module holder, said laser module holder comprising a hand-hold portion of relatively bigger outer diameter at one end, and a neck portion of relatively smaller outer diameter at an opposite end connected to said socket, said hand-hold portion defining a fire hole for passing the laser beam from said semicondutor laser module, said neck portion being mounted with a press button controlled to turn on/off said semiconductor laser module and having two side pins respectively raised form the periphery at two opposite sides and respectively fastened to said retaining grooves of said socket, said press button being received inside said barrel and concealed from sight when said barrel is moved relative to said socket in one direction to force said inside pins to one end of each of said elongated sliding slots of said socket, said press button being moved out of said barrel for operation when said barrel is moved relative to said socket in opposite reversed direction to force said inside pins to an opposite end of each of said elongated sliding slots of said socket.

2. The laser pointer of claim 1 wherein each of said retaining grooves of said socket comprises a longitudinal section, and a radial section extending from an inner end of said longitudinal section at right angles; said side pins of said laser module holder are respectively inserted into said longitudinal sections of said retaining grooves, and then forced into engagement with said radial sections of said retaining grooves through a relative rotary motion between said socket and said laser module holder.

3. The laser pointer of claim 2 wherein each of said retaining grooves of said socket further comprises a raised portion in said respective radial section adjacent to said respective longitudinal section to stop said respective pin in said respective radial section.

4. The laser pointer of claim 1 wherein each of said elongated sliding slots of said socket has two neck portions near two opposite ends to stop said inside pins of said barrel at one end of each of said elongated sliding slot after said inside pins of said barrel are forced to pass over one neck portion of each of said elongated sliding slot.

5. The laser pointer of claim 1 wherein said laser module holder is comprised of two symmetrical half shells fastened together.

6. The laser pointer of claim 1 wherein said socket is comprised of two symmetrical half shells fastened together.

7. The laser pointer of claim 1 wherein said barrel has a hanging hole at one end remote from said laser module holder for hanging.

* * * * *